United States Patent [19]

Nishimura et al.

[11] 4,122,634
[45] Oct. 31, 1978

[54] CAM GRINDING MACHINE

[75] Inventors: Hideo Nishimura, Nagoya; Kuniyuki Niwa, Kariya, both of Japan

[73] Assignee: Toyoda Koki Kabushiki Kaisha, Kariya, Japan

[21] Appl. No.: 835,919

[22] Filed: Sep. 23, 1977

[30] Foreign Application Priority Data

Sep. 23, 1976 [JP] Japan .................. 51-114081

[51] Int. Cl.$^2$ .................. B24B 5/42; B24B 17/10
[52] U.S. Cl. .................. 51/165.71; 51/101 R; 318/578
[58] Field of Search ............ 51/101 R, 165 R, 165.71, 51/165.89, 105 R, 105 FC; 318/568, 578; 90/13.4; 82/18; 364/474

[56] References Cited

U.S. PATENT DOCUMENTS

| 2,641,874 | 6/1953 | Kirby | 51/101 R |
| 2,801,505 | 6/1957 | Comstock | 51/101 R |
| 3,916,571 | 11/1975 | Seidel | 51/101 R |
| 4,005,552 | 2/1977 | Hoglund | 51/101 R |

FOREIGN PATENT DOCUMENTS

| 580,427 | 7/1959 | Canada | 51/101 R |
| 48-95682 | 12/1973 | Japan. | |
| 1,387,113 | 3/1975 | United Kingdom | 51/101 R |

Primary Examiner—N. P. Godici
Attorney, Agent, or Firm—Oblon, Fisher, Spivak, McClelland, & Maier

[57] ABSTRACT

A cam grinding machine rotates a workpiece by using a servomotor which is capable of being rotated at a variable speed. A memory device stores data of rotational speeds of the workpiece corresponding to angular positions thereof in order to maintain the circumferential speed of the workpiece constant. A detecting device detects an angular position of the workpiece. A counter is responsive to the detecting device and reads out rotational speed data stored in the memory device in order to apply the same to the servomotor.

2 Claims, 8 Drawing Figures

1ST CAM C1

2ND CAM C2

3RD CAM C3

4TH CAM C4

CAM GRINDING MACHINE

BACKGROUND OF THE INVENTION

1. Field of the Invention

The present invention relates to a cam grinding machine for grinding a cam of a workpiece, such as a cam shaft, which is capable of controlling a servomotor to rotate the cam at a constant circumferential speed.

2. Description of the Prior Art

In a conventional cam grinding machine for grinding a cam of a cam shaft, a master cam having the same cam profile as the cam to be ground is held in contact with a follower roller so as to pivot or rotate a swing table in accordance with the cam profile of the master cam. The swing table is provided with head and tail stocks to rotatably support the cam shaft, and the cam shaft is rotated synchronously with the master cam at a constant speed so as to be ground by a grinding wheel.

As shown in FIG. 1, in the grinding of a cam C, which is rotated about its own axis at a constant speed and simultaneously swung about a swing center O, by a grinding wheel G rotated at a constant speed, a circumferential speed of the cam C relative to the grinding wheel G is proportional to a radius of a circular portion, such as a top portion T or a base portion B. However, in grinding a side portion S, a grinding point P is shifted and the circumferential speed is rapidly changed, whereby the cam C is ground at its side portion S by more or less than the amount desired. Accordingly, there has been disadvantages in that error in a cam profile and an insufficient accuracy of a finished surface have been created.

In order to solve this problem, an attempt has been made, as disclosed in Japanese patent publication No. 95692/1973, wherein a servomotor for rotating a cam shaft is controlled in proportion to change in life amount or a swing amount of a cam profile of a master cam. While this attempt may be somewhat satisfactory, the circumferential speed cannot be maintained constant because the circumferential speed is not exactly proportional to the change in lift amount.

SUMMARY OF THE INVENTION

It is therefore an object of the present invention to provide a new and improved cam grinding machine capable of generating a cam profile with high accuracy.

Another object of the present invention is to provide a new and improved cam grinding machine which is capable of maintaining constant a circumferential speed of a workpiece relative to a grinding wheel at any angular position of the workpiece.

A further object of the present invention is to provide a new and improved cam grinding machine wherein rotational speed data for a workpiece corresponding to any angular position thereof is stored in a memory device in order to maintain a circumferential speed constant.

A still further object of the present invention is to provide a new and improved cam grinding machine wherein common rotational speed data is used for a plurality of cams with the same cam profile but different angular phases.

Briefly, according to the present invention, these and other objects are achieved by providing a cam grinding machine which comprises a bed, a slide table slidably mounted upon the bed, a swing table swingably journalled upon the slide table, means mounted upon the swing table and including a rotatable spindle for rotatably supporting a workpiece to be ground, a master cam mounted on the spindle and rotated synchronously with the workpiece, a follower roller adapted to be held in contact with the master cam, and drive means for rotating the master cam and the workpiece synchronously in order to generate a cam profile on the workpiece in cooperation with a grinding wheel.

The cam grinding machine according to the present invention further comprises a servomotor included in the drive means, memory means for storing at memory addresses thereof data of rotational speeds of the workpiece corresponding to angular positions of the workpiece, means for detecting an angular position of the workpiece, means connected between the memory means and the detecting means for reading out a rotational speed data of the workpiece from the memory means in response to an angular position of the workpiece detected by the detecting means, and means connected between the memory means and the servomotor for controlling the rotational speed of the servomotor in response to the rotational speed data read out by the reading out means to thereby rotate the workpiece at a constant circumferential speed at any angular position of the workpiece.

BRIEF DESCRIPTION OF THE DRAWINGS

The foregoing and other objects and many of the attendant advantages of the present invention will be readily appreciated as the same becomes better understood by reference to the following detailed description when considered in connection with the accompanying drawings, in which.

DETAILED DESCRIPTION OF THE PREFERRED EMBODIMENT

Figure 1:
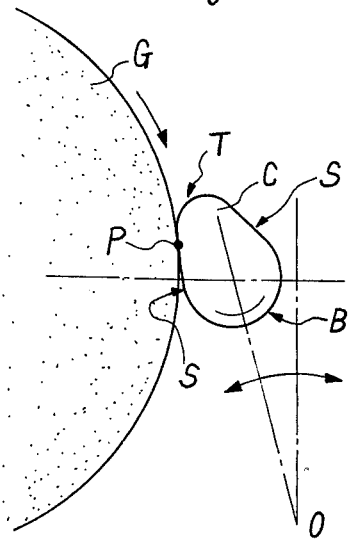
FIG. 1 is a schematic view showing the relative relationship between a grinding wheel and a cam to be ground thereby.
Figure 2:
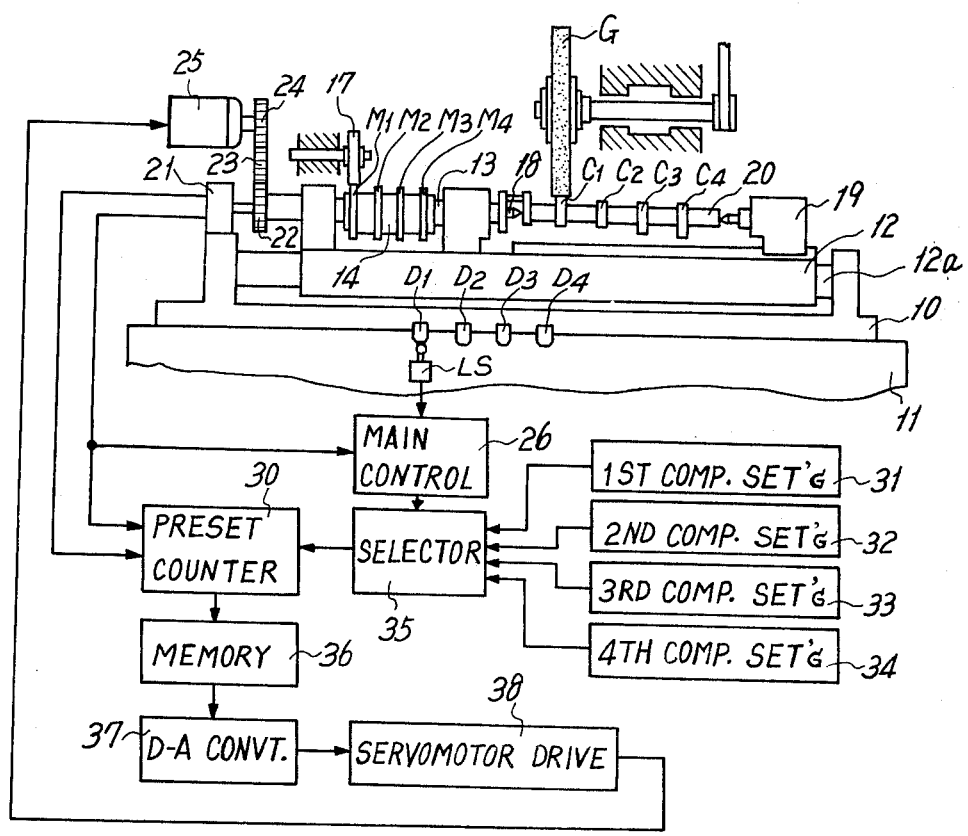
FIG. 2 is a schematic view of a cam grinding machine according to the present invention.
Figure 3:
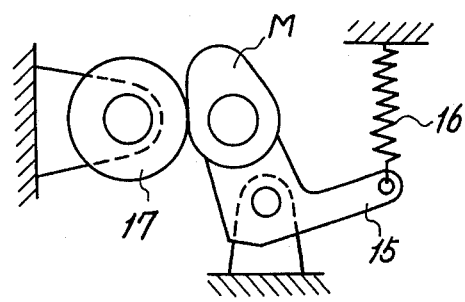
FIG. 3 is a schematic view of a swing mechanism in the cam grinding machine of the present invention.

Referring now to the drawings, wherein like reference numerals or characters refer to identical or corresponding parts throughout the several views, and more particularly to FIG. 2, there is shown a slide table 10 which is slidably mounted upon a bed 11 of a cam grinding machine. A swing table 12 is swingably journalled upon the slide table 10 through means of a support shaft 12a. A spindle 13 is rotatably journalled upon the swing table 12. A tubular master cam shaft 14 is keyed on the spindle 13 and is provided with master cams M1 to M4 having the same cam profiles as cams C1 to C4 to be ground with different angular phases. One of the master cams M1 to M4 is adapted to be aligned with and held in contact with a follower roller 17 through a swing arm 15 and a spring 16, as shown in FIG. 3. The spindle 13 is provided at one end thereof with a center 18 which rotatably supports a cam shaft 20 with the four differently phased cams C1 to C4 to be ground in cooperation with another center held in a foot stock 19 which is mounted upon the swing table 12. The cam shaft 20 is rotated by means of a dog associated with the spindle 13, and ground by means of a grinding wheel G disposed laterally of the cam shaft 20. The grinding wheel G is rotated at a constant speed by means of a drive motor, not shown. The spindle 13 is provided at the other end thereof with a gear 22 which is drivingly connected through gears 23 and 24 with a servomotor 25 capable of being rotated at a variable speed. The other end of the spindle 13 is further connected with a rotation detecting device 21, such as a rotary encoder, which generates a one-pitch signal each time the spindle 13 or the cam shaft 20 is rotated a unit angle and a reference signal each time the spindle 13 is rotated one revolution from a reference detecting point. The slide table 10 is provided with four dogs D1 to D4 having the same axially spaced relationship with the cams C1 to C4 of the cam shaft 20 in order to align one of the cams C1 to C4 with the grinding wheel G in cooperation with a limit switch LS and a main control circuit 26. The main control circuit 26 is operative to fully automatically control a grinding operation in order to successively grind the cams C1 to C4 and generates a signal indicative of the cam aligned with the grinding wheel G.

A control circuit for maintaining constant the circumferential speed of the cam comprises a preset counter 30, compensation amount setting circuits 31 to 34, a selection circuit 35, a memory device 36, a digital-to-analog (D-A) converter 37 and a servomotor driving device 38. The memory device 36 stores such data relating to the rotational speed of the servomotor 25 as to maintain the circumferential speed of the cam constant at every unit angular position of the cam, such as, for example, one degree, spaced from a reference grinding point, such as, for example, the bottom of a base circle portion of the cam. The compensation amount setting circuits 31 to 34 store values corresponding to respective angular differences between the grinding starting points of the cams C1 to C4 and the reference detecting point of the rotation detecting device 21. The selection circuit 35 selects one of the setting circuits 31 to 34, depending upon the one of the cams C1 to C4 being aligned with the grinding wheel G. The preset counter 30 presets, as an initial value, the compensation amount selected by the selection circuit 35, when applied with the reference signal from the rotation detecting circuit 21. The content of the preset counter 30 is increased one by one, until the content becomes 359, each time the cam shaft is rotated one degree and thus the one-pitch signal is applied from the rotation detecting device 21 to the preset counter 30. The content of the preset counter 30 is applied to the memory device as an angular position of the cam from the grinding point. As mentioned previously, the memory device 36 stores values of the rotational speed of the servomotor depending upon the angular position of the cam, and thus outputs the rotational speed of the servomotor 25 with a digital signal stored at a memory address corresponding to the angular position designated by the preset counter 30, such as, for example, at a memory address 1 if the angular position is at one degree. The D-A converter 37 converts the digital signal generated from the memory device 36 into an analog signal which is in turn applied to the servomotor driving device 38 so as to drive the servomotor 25. Accordingly, the servomotor 25 is rotated at a speed stored in the memory device 36 depending upon the angular position of the cam shaft 20.

Figure 4:
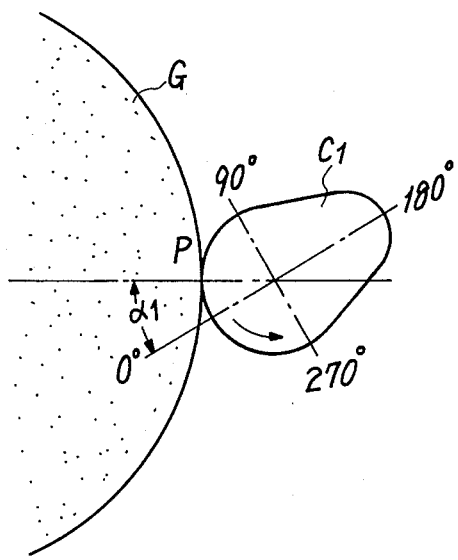
FIG. 4 is a schematic view showing the difference between a reference grinding point of the cam and a reference point of a rotation detecting device according to the present invention.

The operation of the cam grinding machine according to the present invention will now be described, assuming that the cam shaft 20 has four cams C1 to C4, being angularly spaced from each other by 90°, as shown in FIGS. 5A to 5D. Prior to the grinding operation of the cam shaft 20, speeds of the servomotor 25 corresponding to angular positions of the cam from 0° to 359° are stored in the memory device 36 at its memory addresses 0 to 359. Compensation angles corresponding to the cams C1 to C4 are set in the setting circuits 31 to 34. The compensation angle $\alpha 1$ of the first cam C1 is represented as a phase difference between the grinding point P where the reference signal is generated from the rotation detecting device 21 and the reference grinding point of the cam C1, as shown in FIG. 4, and is preset in the setting circuit 31. The compensation angles $\alpha 2$ to $\alpha 4$ of the second to fourth cams C2 to C4 are respectively represented as $\alpha 1 + 90$, $\alpha 1 + 180$ and $\alpha 1 + 270$, since the cams C1 to C4 are angularly spaced from each other by 90 degrees, and are preset in the setting circuits 32 to 34. If the rotation detecting device 21 is adjusted in such a manner as to make the reference point thereof coincide with the reference grinding point of the cam C1, that is, to make the compensation angle $\alpha 1$ zero, the setting circuit 31 may be omitted. In the following description, the compensation angle $\alpha 1$ of the first cam C1 is assumed as zero.

When a push button switch in the main control circuit 26 is depressed, the rotation detecting device 21 being positioned at the reference point generates the reference signal to the preset counter 30. Since, at this time, the first cam C1 is indexed to be aligned with the grinding wheel G, the compensation amount $\alpha 1$, or "zero" in this case, set in the setting circuit 31 is selected by the selection circuit 35 and preset in the preset counter 30. Accordingly, a memory address 0 of the memory device 36 is designated so that a speed data of the servomotor 25 stored at the memory address 0 is read out and applied to the D-A converter 37. The D-A converter 37 converts this speed data into an analog signal which is then applied to the servomotor driving device 38. Therefore, the servomotor 25 is rotated at a speed depending upon the speed data stored at the memory address 0 so as to rotate the first cam C1 of the cam shaft 20 at a predetermined circumferential speed. When the first cam C1 is rotated 1°, the rotation detecting device 21 generates a one-pitch signal to the preset counter 30 so that the content of the preset counter 30 becomes one. Accordingly, speed data for the servomotor 25 stored at a memory address 1 of the memory device 36 is read out. If the rotational speed of the cam is maintained constant at the base circle portion B, the circumferential speed of the cam becomes also constant. Accordingly, the same speed data of the servomotor 25 are stored in the memory device within angles corresponding to the base circle portion B so as to rotate the servomotor 25 at a constant speed.

When the angular position of the first cam C1 is moved from the base circle portion B to the side portion S, speed data taking the shifting of the grinding point P into consideration is read out from the memory device 36 so as to rotate the servomotor 25 at a considerably slower speed than that of the reference grinding point. Accordingly, a circumferential speed of the first cam C1 is maintained constant.

When the first cam C1 is rotated one revolution and thus the grinding point P is at the reference grinding point, the rotation detecting device 21 again generates a reference signal, which causes the compensation amount "zero" set in the setting circuit 31 to be again preset in the preset counter 30. In this manner, the compensation aount in the setting circuit 31 is preset in the preset counter 30 to cause the same to start counting from zero as an initial value each time the first cam C1 is rotated one revolution. Accordingly, even if the preset counter 30 makes miscounting during one revolution of the first cam C1, this error is not accumulated in the next revolution, which provides an accurate detection of the angular position of the first cam C1.

When the first cam C1 is ground to a desired finish size and the grinding point P is shifted to the reference grinding point of the first cam C1, the rotation detecting circuit 21 generates a reference signal which is applied to the main control circuit 26 to stop rotation of the servomotor 25, finishing the grinding operation for the first cam C1.

Figure 5A:
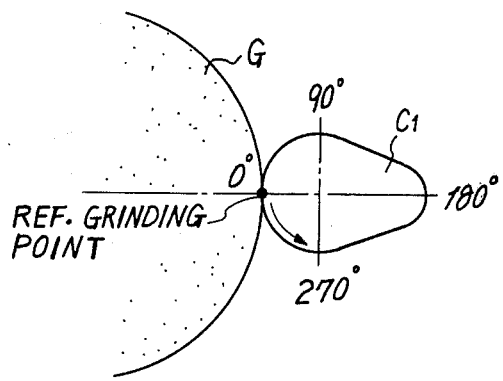
FIG. 5A to 5D show grinding operation starting points in four respective cams.
Figure 5B:
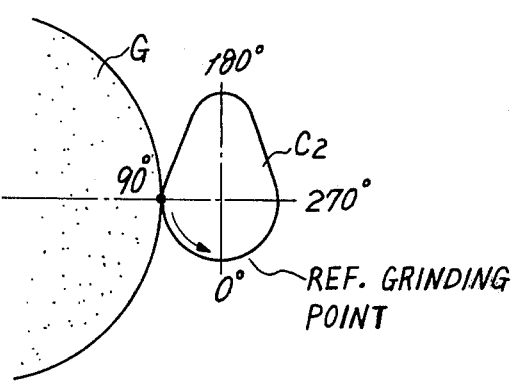
Figure 5C:
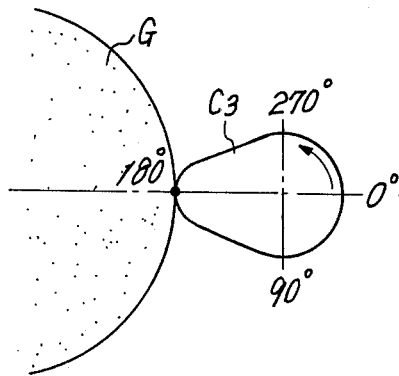
Figure 5D:
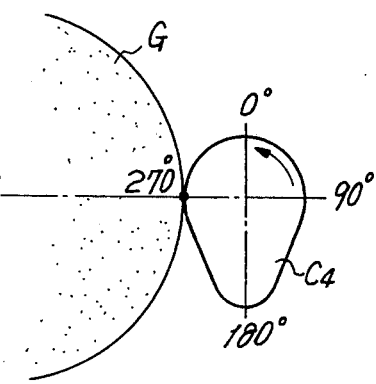

After the first cam C1 is ground to a desired finish size, the second cam C2 and the second master cam M2 are respectively aligned with the grinding wheel G and the follower roller 17. As the second cam C2 is angularly spaced from the first cam C1 by 90°, a grinding operation for the second cam C2 is started from a point which is angularly spaced from the reference grinding point by 90°, as shown in FIG. 5B. When the second cam C2 is aligned with the grinding wheel G, the limit switch LS is actuated by the dog D2, whereby the main control circuit 26 causes the selection circuit 35 to select the second setting circuit 32. Since the rotation detecting circuit 21 is positioned at the reference detecting point when the grinding operation for the first cam C1 is completed, a reference signal is being applied to the preset counter 30 from the rotation detecting circuit 21. Therefore, the content "90" of the second setting circuit is preset into the preset counter 30 as an initial value. Speed data stored at memory address 90 in the memory device 36 is therefore read out for starting a grinding operation for the second cam C2. Thereafter, rotational speed for the second cam C2 is controlled to maintain a circumferential speed of the second cam C2 constant.

The third and fourth cams C3 and C4 are ground in a similar manner.

Obviously, numerous modifications and variations of the present invention are possible in light of the above teachings. It is to be understood, therefore, that within the scope of the appended claims, the invention may be practiced otherwise than as specifically described herein.

What is claimed as new and desired to be secured by Letters Patent of the United States is:

1. In a cam grinding machine having a bed, a slide table slidably mounted upon said bed, a swing table swingably journalled upon said slide table, means mounted upon said swing table and including a rotatable spindle for rotatably supporting a workpiece to be ground, a master cam mounted on said spindle and rotated synchronously with the workpiece, a follower roller adapted to be held in contact with said master cam, and drive means for rotating said master cam and the workpiece synchronously in order to generate a cam profile on the workpiece in cooperation with a grinding wheel, the improvement comprising:

a servomotor in said drive means;
memory means for storing at memory addresses thereof data of rotational speeds of the workpiece corresponding to angular positions of the workpiece;
detecting means for generating a unit signal each time the workpiece is rotated a unit angle and a reference signal at a reference detecting point thereof;
a compensation amount setting circuit for storing a value corresponding to an angular difference between a grinding starting point of the workpiece and the reference detecting point of said detecting means;
a counter responsive to a unit signal from said detecting means for designating a memory address of said memory means to thereby read out a rotational speed data stored at the designated memory address, the content of the compensation amount setting circuit being preset in said counter as an initial value each time said detecting means generates a reference signal; and
means connected between said memory means and said servomotor for controlling the rotational speed of said servomotor in response to the rotational speed data read out by said counter to thereby rotate the workpiece at a constant circumferential speed at any angular position of the workpiece.

2. In a cam grinding machine having a bed, a slide table slidably mounted upon said bed, a swing table swingably journalled upon said slide table, means mounted upon said swing table and including a rotatable spindle for rotatably supporting a workpiece having a plurality of differently phased cams to be ground, a master cam shaft mounted on said spindle and rotated synchronously with the workpiece, said master cam shaft having a plurality of master cams corresponding in number and phase to said cams of the workpiece, a follower roller adapted to be held in contact with one of said master cams, and drive means for rotating said master cam shaft and the workpiece synchronously in order to generate a cam profile on one of said cams of the workpiece in cooperation with a grinding wheel, the improvement comprising:

a servomotor in said drive means;
memory means for storing at memory addresses thereof data of rotational speeds of the workpiece corresponding to angular positions of the workpiece;
detecting means for generating a unit signal each time the workpiece is rotated a unit angle and a reference signal at a reference detecting point thereof;
a plurality of compensation amount setting circuits for storing values corresponding to respective angular differences between grinding starting points of the cams and the reference detecting point of said detecting means;
means for identifying the one of the cams being aligned with said grinding wheel;
selecting means responsive to said identifying means to select one of said compensation amount setting circuits;
a counter responsive to a unit signal from said detecting means for designating a memory address of said memory means to thereby read out a rotational speed data stored at the designated memory address, the content of the compensation amount setting circuit selected by said selecting means being preset in said counter as an initial value each time said detecting means generates a reference signal; and
means connected between said memory means and said servomotor for controlling the rotational speed of said servomotor in response to the rotational speed data read out by said counter to thereby rotate the workpiece at a constant circumferential speed at any angular position of the workpiece.

* * * * *